(12) United States Patent
Mathur et al.

(10) Patent No.: US 8,056,081 B2
(45) Date of Patent: Nov. 8, 2011

(54) CONTROLLING MEMORY USAGE IN SYSTEMS HAVING LIMITED PHYSICAL MEMORY

(75) Inventors: Sharad Mathur, Redmond, WA (US); Michael Ginsberg, Redmond, WA (US); Thomas Fenwick, Redmond, WA (US); Anthony Kitowicz, Kirkland, WA (US); William H. Mitchell, Redmond, WA (US); Jason W. Fuller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2114 days.

(21) Appl. No.: 10/919,596

(22) Filed: Aug. 17, 2004

(65) Prior Publication Data
US 2005/0021917 A1    Jan. 27, 2005

Related U.S. Application Data

(63) Continuation of application No. 08/852,158, filed on May 6, 1997, now Pat. No. 6,938,254.

(51) Int. Cl.
*G06F 9/46* (2006.01)
(52) U.S. Cl. ....................................... 718/104
(58) Field of Classification Search .................... 718/104
See application file for complete search history.

(56) References Cited

U.S. PATENT DOCUMENTS

| | | | |
|---|---|---|---|
| 5,136,713 A * | 8/1992 | Bealkowski et al. .............. 713/2 |
| 5,151,990 A | 9/1992 | Allen et al. | |
| 5,210,872 A | 5/1993 | Ferguson et al. | |
| 5,315,161 A * | 5/1994 | Robinson et al. ............... 307/66 |
| 5,317,752 A | 5/1994 | Jewett et al. | |
| 5,442,759 A * | 8/1995 | Chiang et al. ..................... 705/1 |
| 5,606,685 A * | 2/1997 | Frandeen ...................... 711/117 |
| 5,619,656 A | 4/1997 | Gaf | |
| 5,696,926 A | 12/1997 | Culbert et al. | |
| 5,765,157 A * | 6/1998 | Lindholm et al. ............ 707/101 |
| 5,813,042 A * | 9/1998 | Campbell et al. ............. 711/159 |
| 5,815,702 A | 9/1998 | Kannan et al. | |
| 5,826,082 A | 10/1998 | Bishop et al. | |
| 5,835,765 A | 11/1998 | Matsumoto | |
| 5,881,284 A | 3/1999 | Kubo | |
| 5,900,025 A * | 5/1999 | Sollars .......................... 712/248 |
| 5,909,215 A | 6/1999 | Berstis et al. | |
| 5,950,221 A | 9/1999 | Draves et al. | |
| 6,363,410 B1 | 3/2002 | Kanamori et al. | |
| 6,430,570 B1 | 8/2002 | Judge | |
| 2002/0161932 A1 | 10/2002 | Herger et al. | |

OTHER PUBLICATIONS

Technical Note TN 1042: Strategies for Dealing with Low-Memory Conditions May 1, 1996.*

(Continued)

*Primary Examiner* — Meng An
*Assistant Examiner* — Mengyao Zhe
(74) *Attorney, Agent, or Firm* — Lee & Hayes, PLLC (57) ABSTRACT

Described herein is a method of controlling memory usage in a computer system having limited physical memory, wherein one or more application programs execute in conjunction with an operating system. At a first memory usage threshold, the operating system requests at least one of the application programs to limit its use of memory. At a second memory usage threshold that is more critical than the first memory usage threshold, the operating system requests at least one of the application programs to close itself. At a third memory usage threshold that is more critical than the first and second memory usage thresholds, the operating system terminates at least one of the application programs without allowing its further execution.

38 Claims, 3 Drawing Sheets

OTHER PUBLICATIONS

Inside Macintosh, QuickDraw Gx: Chpater 3, Errors, Warnings, and Notices p. 1, 39-49 1994, Apple Computer, Inc.*

Inside Macintosh, QuickDraw GX Environment and Utilities Addison-Wesley, 1994 Chapter 3.*

Inside Macintosh, QuickDraw GX Enrivonment and Utilities, Addison-Wesley, 1994, Chapter 2.

D. Woo, MoreMem 3.0; Gamma Research, Inc., 1995 pp. (5).

* cited by examiner

CONTROLLING MEMORY USAGE IN SYSTEMS HAVING LIMITED PHYSICAL MEMORY

RELATED APPLICATIONS

This is a continuation of U.S. patent application Ser. No. 08/852,158, filed on Apr. 14, 1997, entitled "Controlling Memory Usage in Systems Having Limited Physical Memory", listing Sharad Mathur, Michael Ginsberg, Thomas Fenwick, Anthony Kitowicz, William H. Mitchell and Jason Fuller as inventors, the disclosure of which is hereby incorporated by reference.

TECHNICAL FIELD

This invention relates to computer systems having virtual memory systems that utilize limited physical memory and no secondary storage.

BACKGROUND OF THE INVENTION

Most modern operating systems implement virtual memory. Virtual memory is a seemingly large amount of memory that allows individual application programs in a multi-tasking system to use respective, dedicated address spaces. Each dedicated address space includes addresses from zero to some large number that depends on the particular characteristics of the operating system and the underlying hardware.

In a virtual memory system, an application program is assigned its own virtual address space, which is not available to other application programs. Through its virtual memory, a process has a logical view of memory that does not correspond to the actual layout of physical memory. Each time a program uses a virtual memory address, the virtual memory system translates it into a physical address using a virtual-to-physical address mapping contained in some type of look-up structure and address mapping database.

Rather than attempting to maintain a translation or mapping for each possible virtual address, virtual memory systems divide virtual and physical memory into blocks. In many systems, these blocks are fixed in size and referred to as sections or pages. Data structures are typically maintained in physical memory to translate from virtual page addresses to physical page addresses. These data structures often take the form of conversion tables, normally referred to as page tables. A page table is indexed by virtual page address or number, and generally has a number of entries corresponding to pages in the virtual address space. Each entry is a mapping of a specific page number or virtual page address to a physical page address.

In most virtual memory systems, physical memory includes some form of secondary storage such as a hard disk. When primary, electronic memory becomes full, physical memory pages are moved to the disk until they are accessed again. This process is referred to as paging. Assuming that the hard disk has a large capacity, paging allows the simulation of seemingly unlimited physical memory.

Although hard disks are common, and are becoming less and less expensive, there is a new generation of computers that implement virtual memory systems without the benefit of secondary storage. Currently, these computers primarily comprise so-called handheld computers or "H/PCs" (handheld PCs). H/PCs typically have a limited amount of non-volatile addressable memory such as battery-backed dynamic RAM (random access memory). Some of this memory is allocated for program execution, while the remaining memory is used to implement a file system. While more capable H/PCs might include actual hard disk storage, this is not the usual situation.

These computers impose new restrictions on the use of virtual memory. In systems that included secondary storage, there was little danger of exhausting physical memory since it could be paged to disk. In an H/PC, however, care must be taken to conserve memory usage. In a multi-tasking system, it is possible to launch a program that competes with other programs and with the operating system for available memory. If any particular program makes high memory demands, it is conceivable that other programs might find themselves without enough memory to continue. Even worse, it is possible that the operating system itself could be unable to obtain needed memory, thereby causing a system crash.

It would be desirable to limit memory usage only when required, rather than prospectively limiting application programs to prescribed memory usage limits. However, it would also be desirable to prevent application programs from threatening system stability. The system and methods described below accomplish these goals.

SUMMARY OF THE INVENTION

The invention is implemented within an operating system that continually or periodically monitors memory usage. Three usage thresholds are established, and different actions are taken as increasingly critical memory usage thresholds are reached. At each threshold, the objective is to free memory so that the next higher threshold is avoided.

At the first, least critical threshold, one or more application programs are simply requested to minimize their memory usage. The request is issued to the least recently active programs, through their Windows® message loops. The applications can respond to the requests as they deem appropriate. Well-behaved applications will take steps to release resources as much as possible.

At the second, more critical threshold, the operating system closes one or more of the application programs. The application is closed using a standard operating system mechanism that allows the application to shut down in an orderly fashion, while saving files and performing any other necessary housekeeping.

At the third, most critical threshold, the operating system simply terminates one or more of the application programs. The application program's thread(s) are destroyed and all resources previously used by the application program are released. The application program is given no opportunity to clean up, to save files, or to perform any other housekeeping chores.

Other measures are potentially employed before taking any of the three measures described above. For example, an attempt is made to reclaim any unused stack space. In addition, read-only memory pages are discarded. Such preventative measures are preferably initiated at further memory usage thresholds. These further thresholds preferably have a fixed relationship to the first, second, and third thresholds noted above.

DETAILED DESCRIPTION OF THE PREFERRED EMBODIMENT

Figure 1:
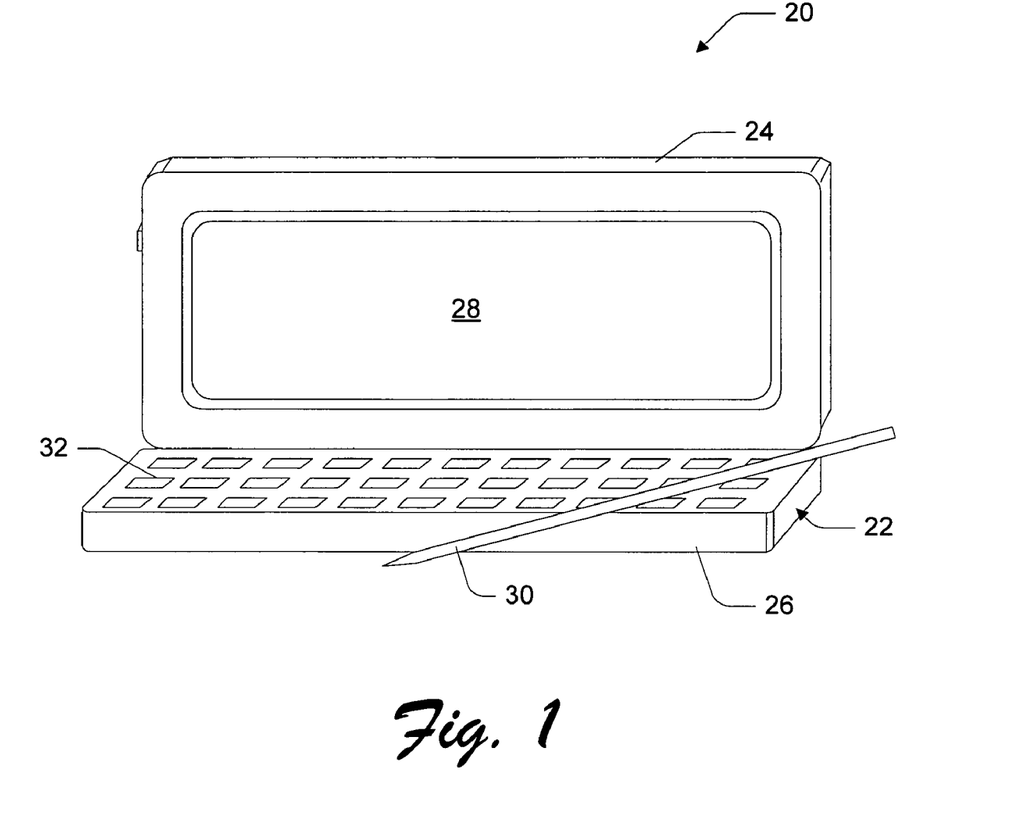
FIG. 1 is shows a handheld computing device 20 in accordance with one embodiment of the invention.

FIG. 1 shows a handheld computing device 20 such as might be utilized to implement the invention. As used herein, "handheld computing device" means a small computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like.

The handheld computing device 20 of FIG. 1 is also referred to as a handheld personal computer (H/PC). However, in other implementations, the handheld computing device may be implemented as a personal digital assistant (PDA), a personal organizer, a palmtop computer, a computerized notepad, or the like. The invention can also be implemented in other types of computers and computer-like or computer-controlled devices.

H/PC 20 has a casing 22 with a cover or lid 24 and a base 26. The H/PC has a liquid crystal display (LCD) 28 with a touch-sensitive screen mounted in lid 24. The lid 24 is hinged to base 26 to pivot between an open position, which exposes screen 28, and a closed position, which protects the screen. The device is equipped with a stylus 30 to enter data through the touchscreen display 28 and a miniature QWERTY keyboard 32. Both of these components are mounted in base 26. H/PC 20 can also be implemented with a wireless transceiver (not shown) such as an IR (infrared) transceiver and/or an RF (radio frequency) transceiver. Although the illustrated implementation shows a two-member H/PC 20 with a lid 24 and a base 26, other implementations of the H/PC might comprise an integrated body without hinged components, as is the case with computerized notepads (e.g., Newton® from Apple Computers).

Figure 2:
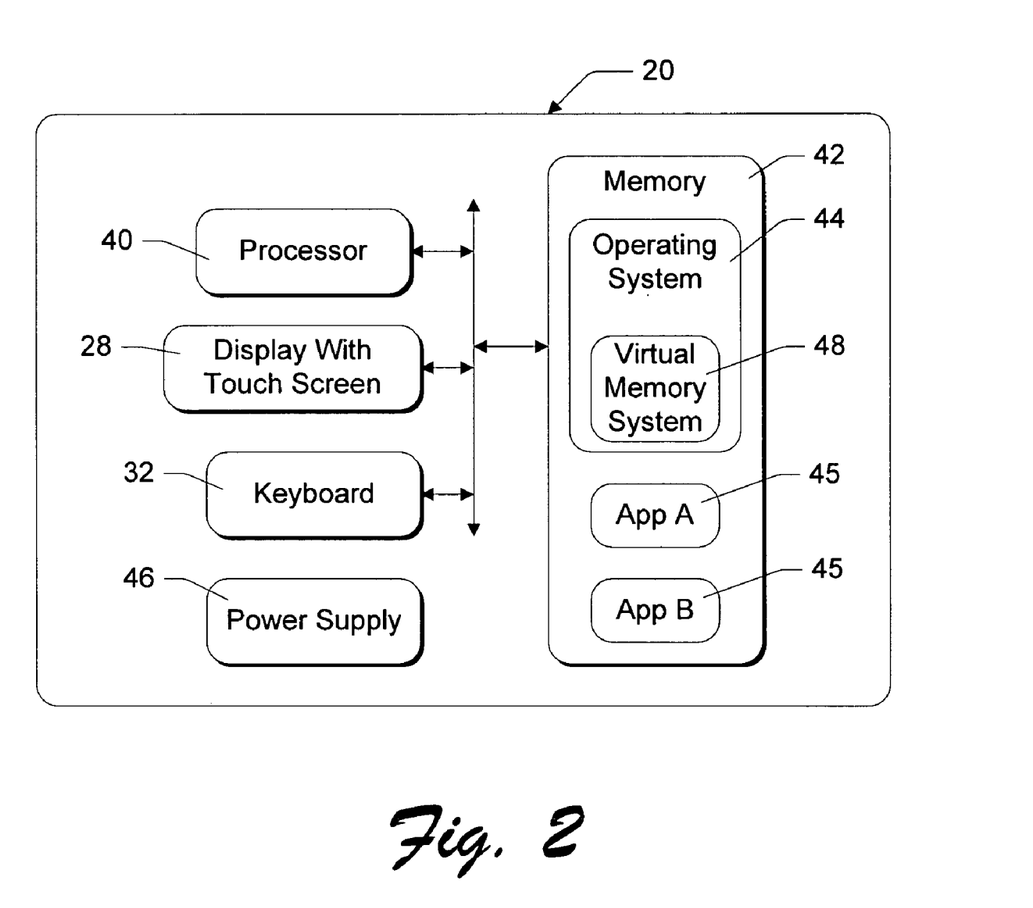
FIG. 2 is a block diagram of the device shown in FIG. 1.

FIG. 2 shows functional components of the handheld computing device 20. It has a processor 40, addressable memory 42, a display 28, and a keyboard 32. At least a portion of memory 42 is non-volatile. The memory is divided into a physical memory portion that is addressed by processor 40 for program execution, and a file portion that is used to implement a file system.

An operating system 44, executed by processor 40, is resident in and utilizes memory 42. H/PC 20 preferably runs the Windows® CE operating system from Microsoft Corporation. This operating system is a derivative of Windows® brand operating systems, such as Windows® 95, that is especially designed for handheld computing devices. The invention is implemented within the Windows® CE operating system—the operating system includes instructions that are executable by processor 40 to implement the features and to perform the specific steps described below.

The Windows® CE operating system is a multitasking operating system that allows simultaneous execution of multiple applications 45. The operating system employs a graphical user interface windowing environment that presents applications and documents in specially delineated areas of the display screen called "windows." Each window can act independently, including its own menu, toolbar, pointers, and other controls, as if it were a virtual display device. It is noted, however, that the handheld computing device may be implemented with other types of operating systems.

The H/PC 20 has a power supply 46 that supplies power to the electronic components. The power supply 46 is preferably implemented as one or more batteries. The power supply 46 might further represent an external power source that overrides or recharges the built-in batteries, such as an AC adapter or a powered docking cradle.

The Windows® CE operating system provides many of the same capabilities of more sophisticated operating systems such as Microsoft Windows® 95 and Microsoft Windows® NT. Particularly, the Window® CE operating system implements a virtual memory system 48 that utilizes portions of physical memory 42. Thus, each application program 45 utilizes physical memory 42 through virtual memory system 48. A notable characteristic of H/PC 20, however, is the absence of secondary storage such as a hard disk. The virtual memory system in Windows® CE is limited to the available physical memory 42, and does not include secondary storage.

Operating system 44 implements a method of controlling memory usage in a system such as shown in FIGS. 1 and 2, in which one or more application programs execute concurrently and in which the application programs compete with each other and with the operating system for available memory.

Generally, operating system 44 monitors memory usage and sets a plurality of memory usage thresholds at which different actions are taken to reduce or minimize current and future memory usage. In the actual embodiment of the invention, the memory thresholds are set in terms of remaining available or uncommitted memory pages, although the thresholds could also be specified in terms of used or committed memory.

Upon reaching increasingly critical memory thresholds, the operating system wields increasing control over one or more of application programs 45 to minimize memory usage. At less critical thresholds, the operating system politely interacts with application programs to limit or minimize their use of memory. For example, at a first or least critical memory usage threshold, the operating system requests one or more application programs to limit or minimize their current use of memory. At a second, more critical memory usage threshold, the operating system uses normal operating system messages to close application programs, thus allowing the application programs to shut down themselves.

At a third critical memory usage threshold that is more critical than the first two thresholds, the operating system simply and abruptly terminates one of the application programs, without allowing any further execution of the application program. The application program is not given the opportunity to shut down itself.

Figure 3:
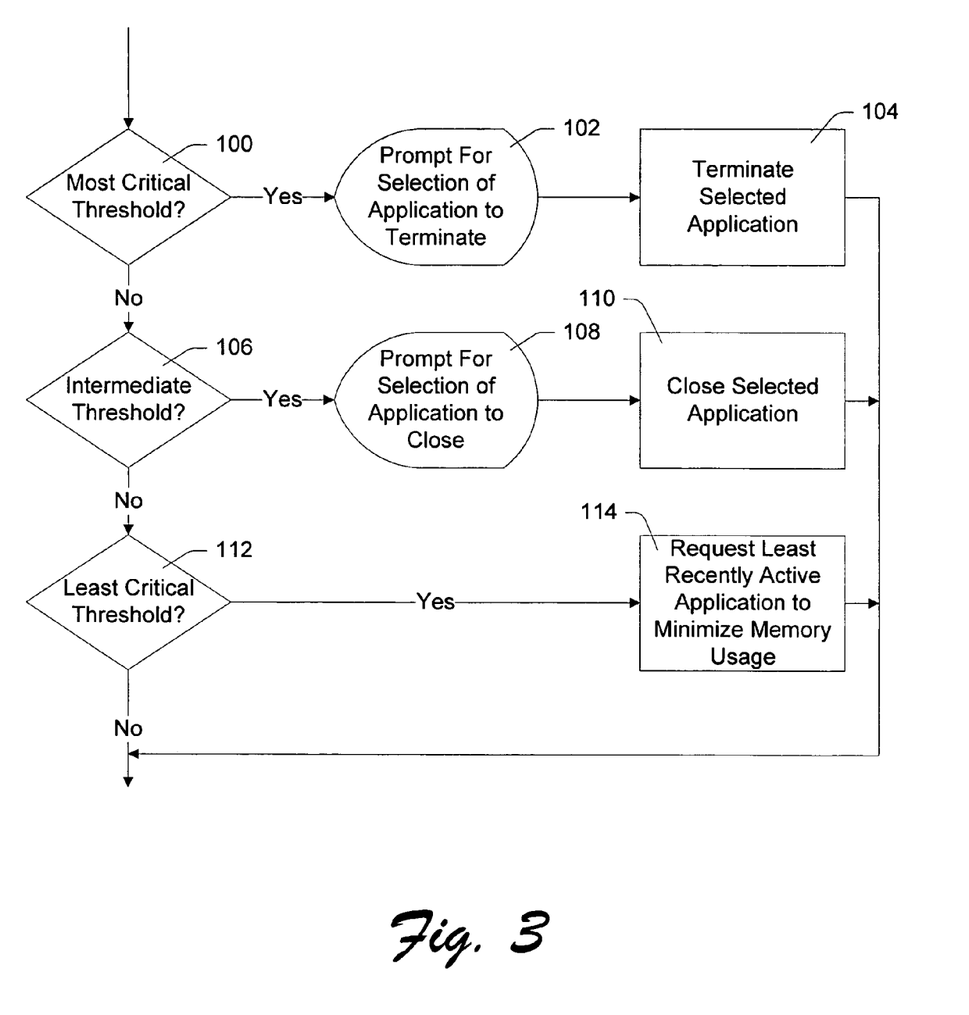
FIG. 3 is a simplified flow chart showing major steps in accordance with the invention.

FIG. 3 shows steps performed by operating system 44 in accordance with the invention. These steps are performed periodically or continuously, as described in more detail below, and do not necessarily follow the sequence suggested by the flowchart of FIG. 3. However, the flowchart is useful for understanding the relationships of the three memory usage thresholds used in the system.

A first step 100 comprises comparing current memory usage or availability against a usage or availability threshold that is deemed to be "most" critical. This memory threshold represents the highest level of memory usage, or the lowest level of free memory, that is considered acceptable for stable system operation. In Windows® CE, this is referred to as the critical memory threshold. If this threshold has been reached, a step 102 is performed of prompting a user to select a currently executing application program to be terminated. In the actual embodiment of the invention, the user is required to respond to this prompt; all other program activity ceases until the user responds.

Prompting the user is accomplished by way of a "System Out of Memory Dialog." This dialog box is a special, "system modal" dialog box that essentially freezes the rest of the system. The user is informed that memory is critically low, and is forced to choose which applications should be shut down.

Step 104 is then performed of terminating the selected program, without allowing its further execution. All of the selected program's threads are destroyed immediately, and all resources used by the program are closed or freed. This potentially causes a loss of data. However, the threshold that causes this is only encountered when memory usage has reached a point where the system might become unstable without immediate remedial action. Thus, the drastic step of terminating a program is justified.

If the result of comparison 100 is negative, the operating system performs a second test 106, comparing current memory usage or availability against a usage or availability threshold that is referred to as an "intermediate" threshold. This threshold, referred to as a low memory threshold, is less critical than the critical memory threshold described above, and is reached while there is still enough memory available so that any particular application program can safely be allowed to shut itself down. If the result of test 106 is positive, a step 108 is performed of prompting the user to select a currently executing application program to be closed (using the System Out of Memory Dialog described above). Again, the user is required to respond to this prompt; all other program activity ceases until the user responds.

Step 110 is then performed of requesting the application to close itself. In the Windows® environment, this is done by sending a WM_CLOSE message to the application's message loop, giving the same effect as if the user had pressed the application's Close button. The operating system gives the application a predefined time in which to close itself, such as eight seconds. If after that predefined time, memory is still low, the dialog box will reappear. Also, if at any time during those eight seconds, more memory is requested such that the amount of free memory goes below the critical memory threshold, the "System Out of Memory Dialog" discussed in conjunction with step 102 will immediately appear. Accordingly, applications should be configured to shut down without allocating very much additional memory.

If the result of comparison 106 is negative, the operating system performs a third test 112, comparing current memory usage or availability against a usage or availability threshold that is referred to as the "hibernation" critical threshold. This threshold is less critical than the other two thresholds, and thus occurs when there is still a relatively higher amount of available or free physical memory. If the result of test 112 is positive, a step 114 is performed of sending a "hibernate" message from the operating system to at least one of the application programs requesting it to minimize its current use of memory.

In the Windows® environment, only one of the concurrently executing programs is "active" at any particular time, even though multiple programs might be executing and partially visible. The active program is typically the one that has the focus, and is the one to which keyboard and mouse inputs are directed. In the Windows® CE environment, specifically, currently executing application programs are listed on the taskbar which is displayed to the user. The operating system maintains a "Z" order, indicating the relative positions of the applications' windows from front to back. This order also indicates the order in which the applications were last active: the rearmost application program is the least recently active. In the actual embodiment of the invention, the hibernate message of step 114 is sent to a particular application program that has been least recently active. Thus, a currently active program will not be affected, at least initially. In practice, such messages are sent to a plurality of programs, in order according to which programs were least recently active. The messages are sent with short delays between messages, until available memory is again above the hibernation threshold.

The particular mechanism for sending a message to an application program will vary depending on the particular operating system or computer architecture in use. In the Windows® environment, however, each application program has a main window that implements what is commonly referred to as a message loop. The operating system sends different types of messages to the application programs' message loops, such as messages that indicate keyboard or mouse activity. In the preferred embodiment of the invention, the message of step 114 is sent from the operating system through an application's message loop as a message having a pre-defined message ID.

An application program can respond to a hibernation message in any way it sees fit. Non-compliant application programs might simply ignore the messages. Ideally, however, an application program will take steps to minimize or reduce its current use of virtual and physical memory. Preferably, an application will first determine whether any portion of the application is visible to the user. If it is not visible, the application should store all data structures representing current context or state information, and release all other resources that can be reconstructed if and when needed in the future. Thus, the user will perceive no unusual activity, except perhaps a slight slowing of the system.

Specifically, in response to a hibernate message an application should perform acts of:

(1) Freeing any large pieces of memory (such as caches) that were previously allocated by the operating systems virtual memory allocation function (VirtualAlloc in Windows® CE).

(2) Freeing as many GWES (graphics/window/event manager) objects as possible. Such objects include windows, bitmaps, and device contexts.

(3) Saving state information and data to persistent storage for later restoration, and then free as much of the application heap as possible.

Although FIG. 3 is useful for understanding the invention conceptually, the comparison steps are not necessarily performed in a sequence as suggested in the flowchart. In operation, the hibernation memory threshold is the first line of defense against low memory situations. Step 112, which checks available memory against the hibernation threshold, is actually performed at periodic intervals such as every five seconds. If the hibernation memory usage threshold has been reached at any particular time, a hibernate message is sent to the least recently active application that has not already received such a message. The operating system maintains a flag indicating which applications have been sent such messages. If the condition continues, hibernation messages will be sent to additional applications.

No explicit action is taken to "unhibernate" an application. Rather, the application program reactivates itself as a result of activation by the user through normal Windows® CE commands such as by clicking on the program's icon on the taskbar. The operating system notes when an application program is made active and resets the flag to indicate that the program is no longer in a hibernation state.

In addition to "hibernating" applications during periods of excessive memory usage, the operating system takes further memory conservation measures when the hibernation threshold has been reached. For instance, the operating system shell will not allow browsing the file system using new browser windows (although existing browser windows are allowed to function normally). In addition, the operating system shell will not allow its internal icon display cache to be modified. Under normal memory conditions, the operating system shell will purge and rebuild its internal icon display cache periodically. In a hibernating state the shell needs to maintain consistency, and might not be able to rebuild its cache.

In spite of hibernation messages, the system may still run critically low on memory. This can happen, for example, when an active application continues to demand more memory while non-active applications are being hibernated. The two remaining memory thresholds (the low memory threshold and the critical memory threshold) are encountered when the system is very close to failing a memory allocation call. If this happens, the system displays the memory handler dialog box as described above. The user is informed that memory is critically low, and is forced to choose which application or applications should be shut down. After the dialog box is dismissed, each selected application is closed as described above. As a further memory conservation measure, the operating system shell will not allow a user to launch new applications from the operating system's user interface (such as from the "run" dialog box or by double clicking icons) when available memory is below the intermediate threshold.

The low memory threshold and critical memory threshold are checked (steps 100 and 106) when application programs attempt to allocate more virtual memory by invoking the VirtualAlloc interface of the Windows® CE operating system. The operating system maintains the following precautions in helping to prevent low memory conditions from occurring:

When an application allocates memory, the system "filters" this request by limiting the memory size. This prevents a single application from stealing all available memory with one large allocation. When the system enters a low memory situation, the maximum memory limit is further reduced.

The system monitors available memory and handles two levels of memory conditions: the Low Memory threshold, and the Critical Memory threshold (in addition to the hibernation threshold discussed above).

The table below defines values for these thresholds and maximum memory allocations for the two levels of low memory conditions, as used in the present embodiment of the invention. The names are defined simply to aid in describing the low memory scenarios below. The actual values are examples which might vary in different systems and with different memory configurations.

| Item | Value | Description |
| --- | --- | --- |
| HIBERNATION_THRESHOLD | 128 K | Minimum available system memory, below which defines a "low memory" system. A WM_HIBERNATE message is sent when the system memory falls below this value. |
| LOWMEM_THRESHOLD | 64 K | Minimum available memory size system must maintain when system is in a "low" memory state. |
| LOWMEM_MAXSIZE | 16 K | Maximum size allowed to be allocated (using VirtualAlloc) when system is in a "low" memory state. |
| CRITMEM_THRESHOLD | 16 K | Minimum available memory size system must maintain when system is in a "critical" memory state. |
| CRITMEM_MAXSIZE | 8 K | Maximum size allowed to be allocated (using VirtualAlloc) when system is in a "critical" memory state. |

Under a low memory condition, the system's low memory handler appropriately responds to basically four situations:

An application calls VirtualAlloc requesting a memory size greater than LOWMEM_MAXSIZE. Any VirtualAlloc requesting a memory size greater than LOWMEM_MAXSIZE will be failed if it would cause the amount of free physical memory in the system to go below the LOWMEM_THRESHOLD. No System Out of Memory Dialog will be displayed.

An application calls VirtualAlloc requesting a memory size less than LOWMEM_MAXSIZE. If a VirtualAlloc requesting a memory size less than LOWMEM_MAXSIZE would cause the amount of free physical memory in the system to go below the LOWMEM_THRESHOLD, then the System Out of Memory Dialog is displayed. The user is allowed to either select some applications that the system will try to close, or to get more memory by taking it from the file system. The system sends WM_CLOSE messages to the applications selected by the user. If an application marked to be closed does not shutdown within 8 seconds, an End Task/Wait dialog is displayed, giving the user the choice of terminating the application or waiting some more time.

An application calls VirtualAlloc requesting a memory size greater than CRITMEM_MAXSIZE. Any VirtualAlloc requesting a memory size greater than CRITMEM_MAXSIZE will be failed if it would cause the amount of free physical memory in the system to go below the CRITMEM_THRESHOLD.

An application calls VirtualAlloc requesting a memory size less than CRITMEM_MAXSIZE. If a VirtualAlloc requesting a memory size less than CRITMEM_MAXSIZE would cause the amount of free physical memory in the system to go below the CRITMEM_THRESHOLD, then the System Out of Memory Dialog is displayed. The user is allowed to either select some applications that the system will try to close, or to get more memory by taking it from the file system. The system calls TerminateProcess to terminate any applications selected by the user.

Before a call to VirtualAlloc is allowed to fail, additional steps are taken within operating system 44 to minimize physical memory usage. For example, stack scavenging is employed periodically to recover unused stack space. Unused stack space is virtual memory that has been committed for use by a stack, but that is not currently being used. Unused stack space results when a stack grows and then shrinks. When entire unused pages are left beyond the current stack pointer, such pages can be discarded or reclaimed for other use. Page discarding is another tactic that is used by operating system 44 to minimize the use of memory before failing a call to VirtualAlloc. Using this tactic, read-only pages are discarded if they have not been used recently.

In operating system 44, steps of reclaiming unused stack memory and discarding read-only memory pages are also performed as a result of reaching defined memory thresholds. These thresholds are preferably set in relation to the three thresholds described above, so that the reclaiming and discarding steps occur at slightly less critical thresholds than the more active steps shown in FIG. 3. In other words, reclaiming and discarding steps occur before requesting an application to minimize its memory usage, before requesting an application program to close itself, and before terminating an application program.

Alternatively, an operating system in accordance with the invention might initiate reclaiming and discarding steps just prior to steps 100, 106, and 112 of FIG. 3. If these steps were to free enough memory, further memory freeing steps could be skipped.

The invention provides an effective way of preventing memory usage from exceeding safe limits. The actions taken at less critical thresholds interfere as little as possible with a user's actual work, while increasing levels of memory usage result in necessarily more intrusive measures. However, these more intrusive measures are often avoided by the actions resulting from the less critical thresholds. Thus, a user is able to make very effective use of the limited physical memory available in popular, inexpensive computer devices.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of controlling memory usage in a computer system having limited physical memory, wherein one or more application programs execute in conjunction with an operating system, the method comprising:
setting a plurality of memory thresholds; and
at increasingly critical memory thresholds, correspondingly increasing control over the one or more application programs to reduce memory usage, the increasing control comprising:
reclaiming unused stack memory and discarding read-only memory as a result that a memory usage reaches one or more of the memory thresholds;
determining that the reclaiming and discarding does not free enough memory for the memory usage;
at a first memory threshold, communicating a request to at least one of the application programs for the at least one of the application programs to limit its use of the physical memory; and
at a second memory threshold, terminating at least one of the application programs without allowing its further execution, the second memory threshold being more critical than the first memory threshold.

2. A method as recited in claim 1, wherein the increasing control further comprises: prompting a user to select at least one of the application programs; and requesting, by the operating system, that the at least one application program close itself.

3. A method as recited in claim 1, wherein the increasing control further comprises:
prompting a user to select at least one of the application programs; and
terminating the at least one of the application programs selected without allowing its further execution.

4. A method as recited in claim 1, wherein the increasing control further comprises:
at a third memory threshold more critical than the first memory threshold and less critical than the second memory threshold, communicating a request for at least the one of the application programs to close itself within a predefined time.

5. A method as recited in claim 1, wherein the increasing control further comprises:
at a third memory threshold more critical than the first memory threshold and less critical than the second memory threshold, prompting a user to select at least one of the application programs and requesting the at least one of the application programs selected to close itself within a predefined time; and
wherein at the second memory threshold, the terminating comprises prompting the user to select at least one of the application programs and then terminating it without allowing its further execution.

6. A computer-readable storage medium having computer-executable instructions, which, when executed by one or more processors, cause the one or more processors to perform acts consonant with a method of controlling memory usage in a computer system having limited physical memory, wherein one or more application programs execute in conjunction with an operating system, the acts comprising:
setting a plurality of memory thresholds; and
at increasingly critical memory thresholds, correspondingly increasing, by the operating system, control over the one or more application programs to reduce memory usage, the increasing control comprising:
reclaiming unused stack memory and discarding read-only memory as a result that a memory usage reaches one or more of the memory thresholds;
determining that the reclaiming and discarding does not free enough memory for the memory usage;
at a first memory threshold, communicating a request to at least one of the application programs for the at least one of the application programs to limit its use of the physical memory; and
at a second memory threshold, terminating at least one of the application programs without allowing its further execution, the second memory threshold being more critical than the first memory threshold.

7. A computer-readable storage medium having instructions for controlling memory usage in a computer system having limited physical memory, wherein one or more application programs execute in conjunction with an operating system, the instructions being executable by the computer system to perform acts comprising:
determining a plurality of memory usage thresholds;
in response to determining that a memory usage reaches a first memory usage threshold, requesting at least one of the application programs to close itself;
in response to determining that the memory usage reaches a second memory usage threshold that is more critical than the first memory usage threshold, terminating at least one of the application programs without allowing its further execution; and
reclaiming unused stack memory and discarding read-only memory before requesting at least one of the application programs to close itself and before terminating at least one of the application programs.

8. A computer-readable storage medium as recited in claim 7, the instructions being executable to perform additional acts comprising:
   before requesting, prompting a user to select one of the application programs to be closed; and
   before terminating, prompting the user to select one of the application programs to be terminated.

9. A computer-readable storage medium as recited in claim 7, the instructions being executable to perform additional acts comprising:
   before requesting, requiring a user to select one of the application programs to be closed; and
   before terminating, requiring the user to select one of the application programs to be terminated.

10. A computer-readable storage medium as recited in claim 7, the instructions being executable to perform an additional step comprising:
    at a further memory threshold that is less critical than the less critical memory thresholds, requesting at least one of the application programs to limit its use of memory.

11. A computer-readable storage medium as recited in claim 7, the instructions being executable to perform an additional act comprising reclaiming unused stack memory before requesting and before terminating.

12. A computer-readable storage medium as recited in claim 7, the instructions being executable to perform an act step comprising discarding read-only memory before requesting and before terminating.

13. A computer-readable storage medium as recited in claim 7, the instructions being executable to perform additional acts comprising reclaiming unused stack memory and discarding read-only memory before requesting and before terminating.

14. A method of controlling memory usage in a computer system having limited physical memory, wherein one or more application programs execute in conjunction with an operating system, comprising:
    determining a plurality of memory usage thresholds;
    in response to determining that a memory usage reaches a first memory usage threshold, requesting, by the operating system, at least one of the application programs to limit its use of memory;
    in response to determining that the memory usage reaches a second memory usage threshold that is more critical than the first memory usage threshold, requesting, by the operating system, at least one of the application programs to close itself within a predefined time;
    in response to determining that the memory usage reaches a third memory usage threshold that is more critical than the first and second memory usage thresholds, terminating, by the operating system, at least one of the application programs immediately without allowing its further execution; and
    reclaiming, by the operating system, unused stack memory and discarding, by the operating system, read-only memory before requesting at least one of the application programs to close itself and before terminating at least one of the application programs.

15. A method as recited in claim 14, wherein reclaiming and discarding are performed at further memory usage thresholds that are set in relation to the second and third memory usage thresholds.

16. A method as recited in claim 14, wherein reclaiming and discarding are performed at further memory usage thresholds that are set in relation to the first, second, and third memory usage thresholds.

17. A method as recited in claim 14, further comprising the following additional acts:
    before requesting, prompting a user to select one of the application programs to be closed; and
    before terminating, prompting the user to select one of the application programs to be terminated.

18. A method as recited in claim 14, further comprising the following additional acts:
    before requesting, requiring a user to select one of the application programs to be closed; and
    before terminating, requiring the user to select one of the application programs to be terminated.

19. A computer-readable storage medium having computer-executable instructions which, when executed by one or more processors, cause the one or more processors to control memory usage in a computer system having limited physical memory, wherein one or more application programs execute in conjunction with an operating system, by causing the one or more processors to perform acts of:
    determining a plurality of memory usage thresholds;
    reclaiming unused stack memory and discarding read-only memory as a result that a memory usage reaches one or more of the memory usage thresholds; determining that the reclaiming and discarding does not free enough memory for the memory usage;
    requesting at least one of the application programs to limit its use of memory in response to determining that the memory usage reaches a first memory usage threshold;
    requesting at least one of the application programs to close itself within a predefined time in response to determining that the memory usage reaches a second memory usage threshold that is more critical than the first memory usage threshold;
    terminating at least one of the application programs immediately without allowing its further execution in response to determining that the memory usage reaches third memory usage threshold that is more critical than the first and second memory usage thresholds.

20. A computer system comprising:
    a processor;
    an operating system that is executable by the processor and that utilizes the physical memory;
    a virtual memory system that includes physical memory but does not include secondary storage; and
    one or more application programs that utilize the virtual memory system, the operating system being configured to perform acts of:
    monitoring physical memory usage; and
    at increasingly critical physical memory usage thresholds, increasing control over the one or more application programs to reduce physical memory usage, the increasing control comprising:
      at a first memory threshold, communicating a request to at least one of the application programs for the at least one of the application programs to limit its use of the physical memory;
      at a second memory threshold, terminating at least one of the application programs immediately without allowing its further execution, the second memory threshold being more critical than the first memory threshold; and
      reclaiming unused stack memory and discarding read-only memory before requesting at least one of the application programs to limit its use of the physical memory and before terminating at least one of the application programs.

21. A computer system as recited in claim 20, wherein the increasing control comprises prompting a user to select at least one of the applications programs and then requesting it to close itself.

22. A computer system as recited in claim 20, wherein the increasing control comprises prompting a user to select at least one of the applications programs and then terminating it without allowing its further execution.

23. A computer system as recited in claim 20, wherein the increasing control further comprises:
   at a third memory threshold greater than the first memory threshold and less than the second memory threshold, communicating a request for at least the one of the application programs to close itself within a predefined time.

24. A computer system as recited in claim 20, wherein the increasing control further comprises:
   at a third memory threshold greater than the first memory threshold and less than the second memory threshold, prompting a user to select at least one of the application programs and then requesting it to close itself; and wherein at the more critical memory threshold, the terminating comprises prompting the user to select at least one of the application programs and then terminating it immediately without allowing its further execution.

25. A computer system as recited in claim 20, wherein the operating system is further configured to perform act of reclaiming unused stack memory at one or more of the memory thresholds.

26. A computer system as recited in claim 20, wherein the operating system is further configured to perform act of discarding read-only memory at one or more of the memory thresholds.

27. A computer system as recited in claim 24, wherein the increasing control further comprises:
   before prompting the user, reclaiming unused stack memory and discarding read-only memory.

28. A method of controlling memory usage in a computer system having limited physical memory, wherein one or more application programs execute in conjunction with an operating system, comprising:
   monitoring memory usage;
   determining one or more thresholds of the memory usage;
      at a first threshold, communicating a request to at least one of the application programs for the at least one of the application programs to limit its use of the physical memory; and
      at a second threshold, terminating at least one of the application programs without allowing its further execution, the second memory threshold being more critical than the first memory threshold;
   in response to determining that the memory usage reaches the first threshold,
      reclaiming, by the operating system, unused stack memory before sending a message from the operating system to at least one of the application programs requesting the application program to minimize its current use of memory; and
      sending, by the operating system, the message to at least one of the application programs requesting the application program to minimize its current use of memory by:
         freeing at least one large piece of physical memory that has been previously allocated to the at least one of the application programs;
         freeing one or more objects in the physical memory that belong to the at least one of the application programs; and
         freeing, after the at least one of the application programs saves state information and data to persistent storage, application heap corresponding to the at least one of the application programs.

29. A method as recited in claim 28, further comprising sending the message to the application program when memory usage reaches a defined threshold.

30. A method as recited in claim 28, wherein the application programs have respective message loops, the method further comprising sending the message to the application program through its message loop.

31. A method as recited in claim 28, wherein the application programs have respective message loops, the method further comprising sending the message to a particular application program that was least recently active.

32. A computer-readable storage medium having computer-executable instructions for performing the steps recited in claim 28.

33. A computer-readable storage medium having instructions for controlling memory usage in a computer system having limited physical memory, wherein one or more application programs execute in conjunction with an operating system, the instructions being executable by the computer system to perform acts comprising:
   monitoring memory usage;
   determining one or more memory usage thresholds;
      at a first memory usage threshold, communicating a request to at least one of the application programs for the at least one of the application programs to limit its use of the physical memory; and
      at a second memory usage threshold, terminating at least one of the application programs without allowing its further execution, the second memory threshold being more critical than the first memory threshold;
   in response to determining that the memory usage reaches the first memory usage threshold,
      discarding, by the operating system, read-only memory before sending a message from the operating system to at least one of the application programs requesting the application program to reduce its current use of memory; and
      sending the message from the operating system to at least one of the application programs requesting the application program to reduce its current use of memory by:
         freeing at least one large piece of physical memory that has been previously allocated to the at least one of the application programs;
         freeing one or more objects in the physical memory that belong to the at least one of the application programs; and
         freeing, after the at least one of the application programs saves state information and data to persistent storage, application heap corresponding to the at least one of the application programs.

34. A computer-readable storage medium as recited in claim 33, wherein the application programs have respective message loops, the instructions being executable to perform a further act of sending the message to the application program through its message loop.

35. A computer-readable storage medium as recited in claim 33, wherein the application programs have respective message loops, the instructions being executable to perform a further act of sending the message to a particular application program that was least recently active.

36. An application program that resides in a computer-readable memory for execution by a processor in conjunction with an operating system, the application program performing instructions executable by the processor comprising:
  receiving a message from the operating system at one or more memory usage thresholds:
    at a first memory usage threshold, receiving a message from the operating system to the application program to limit its use of a physical memory; and
    at a second memory usage threshold, receiving a message from the operating system to terminate the application programs without allowing its further execution, the second memory threshold being more critical than the first memory threshold;
  in response to receiving the message from the operating system to the application program to limit its use of a physical memory at the first memory usage threshold,
  reclaiming unused stack memory and discarding read-only memory;
  freeing at least one large piece of physical memory that has been previously allocated to the application programs;
  freeing one or more objects in the physical memory that belong to the application program;
  saving state information and data to persistent storage for later restoration; and
  after the saving, freeing application heap corresponding to the application program.

37. A method as recited in claim 1, wherein limiting use of the physical memory of the at least one of the application programs comprises:
  freeing at least one large piece of physical memory that has been previously allocated to the at least one of the application programs;
  freeing one or more objects in the physical memory that belong to the at least one of the application programs; and
  freeing, after the at least one of the application programs saves state information and data to persistent storage, application heap corresponding to the at least one of the application programs.

38. A computer system as recited in claim 20, wherein limiting use of the physical memory of the at least one of the application programs:
  freeing at least one large piece of physical memory that has been previously allocated to the at least one of the application programs;
  freeing one or more objects in the physical memory that belong to the at least one of the application programs; and
  freeing, after the at least one of the application programs saves state information and data to persistent storage, application heap corresponding to the at least one of the application programs.

* * * * *